United States Patent [19]

Hasquenoph, deceased et al.

[11] Patent Number: 4,620,680

[45] Date of Patent: Nov. 4, 1986

[54] DEVICE FOR CARRYING AND EJECTING UNDER AIRCRAFT LOADS, COMPRISING SUPPORT ARMS POSITIONED WITH RESPECT TO THE DIAMETER OF THE LOADS

[75] Inventors: Jean Hasquenoph, deceased, late of Lagny sur Marne, by Simone Hasquenoph, legal representative; Pierre F. Coutin, Paris, both of France

[73] Assignee: R. Alkan & Cie, France

[21] Appl. No.: 675,781

[22] Filed: Nov. 28, 1984

[30] Foreign Application Priority Data

Nov. 30, 1983 [FR] France .................... 83 19141

[51] Int. Cl.[4] .............................................. B64C 1/02
[52] U.S. Cl. .................................. 244/137 A; 89/1.53; 294/82.26; 294/82.31
[58] Field of Search ............. 244/137 A, 137 R; 89/1.53; 294/82.24, 82.26, 82.31, 82.32; 269/229, 230; 74/567, 565, 527

[56] References Cited

U.S. PATENT DOCUMENTS

| | | | |
|---|---|---|---|
| 586,359 | 7/1897 | Holt | 269/230 |
| 3,242,808 | 3/1966 | Nelson et al. | 294/82.26 |
| 3,670,620 | 6/1972 | Paraskewik | 89/1.53 |
| 4,168,046 | 9/1979 | Hasquenoph et al. | 294/82.26 |
| 4,183,480 | 1/1980 | Jakubowski, Jr. | 244/137 R |
| 4,184,801 | 1/1980 | Nicoloff et al. | 244/137 A |
| 4,196,879 | 4/1980 | Craigie | 244/137 A |
| 4,202,576 | 5/1980 | Hasquenoph et al. | 294/82.26 |
| 4,257,567 | 3/1981 | Hasquenoph et al. | 244/137 A |

FOREIGN PATENT DOCUMENTS

| | | | |
|---|---|---|---|
| 594608 | 11/1947 | United Kingdom | 89/1.53 |
| 594609 | 11/1947 | United Kingdom | 89/1.53 |
| 762818 | 12/1956 | United Kingdom | 269/229 |

*Primary Examiner*—Galen Barefoot
*Assistant Examiner*—Lynn M. Fiorito
*Attorney, Agent, or Firm*—William A. Drucker

[57] ABSTRACT

The invention provides a device for carrying under an aircraft and ejecting loads which are suspended from hooks which may be raised so as to be set under support arms hinged about longitudinal pins, lowering of the arms against a load which is hooked on allows automatic positioning of stops automatically limiting the raising of the arms under the action of springs to different levels depending on the diameter of the load hooked on. The stops may form part of stepped cams urged by springs into the position bringing the lowest possible stop into action.

5 Claims, 8 Drawing Figures

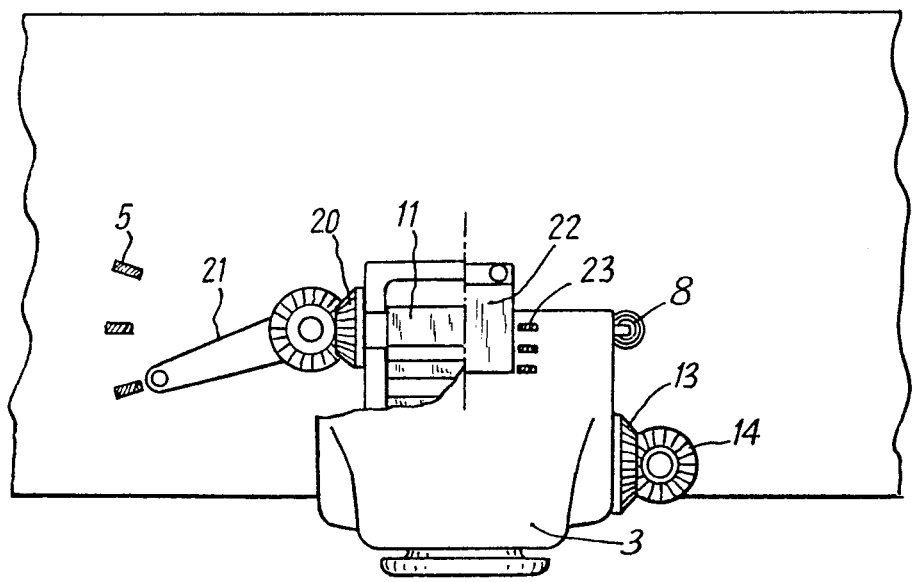
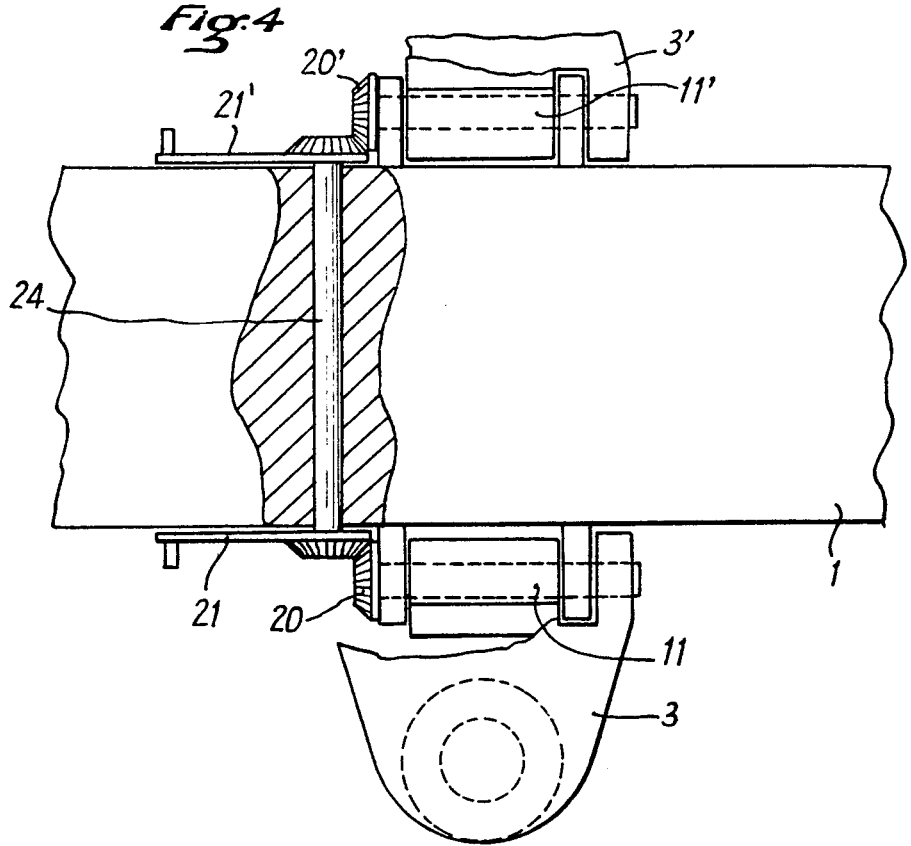

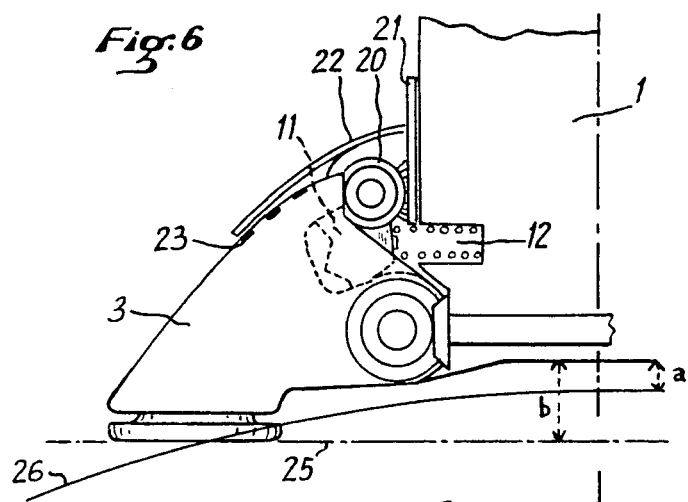
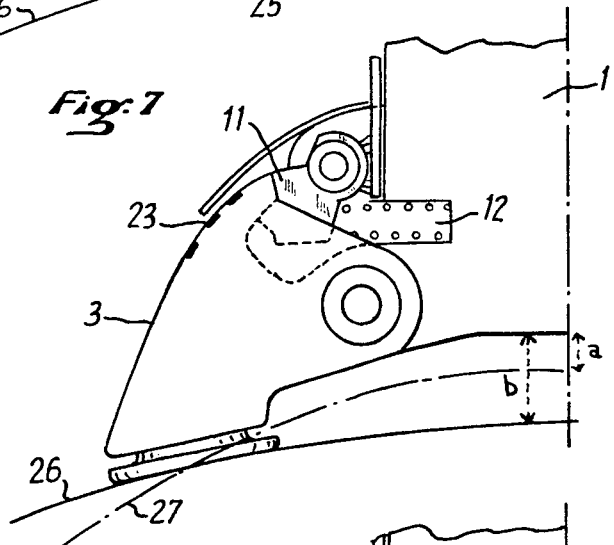
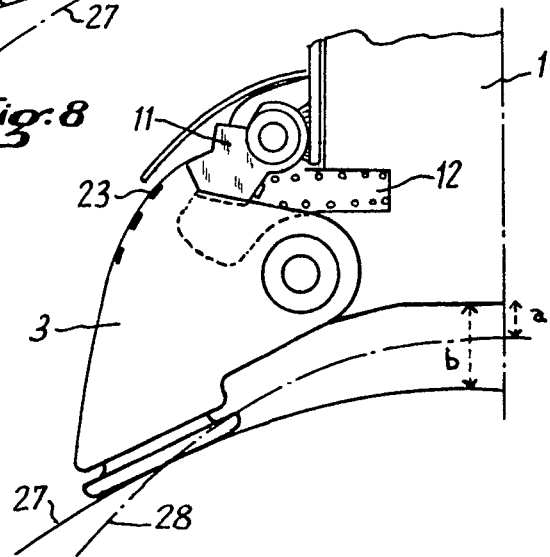

DEVICE FOR CARRYING AND EJECTING UNDER AIRCRAFT LOADS, COMPRISING SUPPORT ARMS POSITIONED WITH RESPECT TO THE DIAMETER OF THE LOADS

BACKGROUND OF THE INVENTION

1. Field of the Invention

The device of the present invention, described hereafter and shown in the accompagnying drawings, is an ejecting release means capable of carrying and ejecting loads, comprising rings with between axis spacing of 14 inches (355.6 mm) or 30 inches (762 mm). It comprises means which generally equip this kind of device and which form the subject matter of different patents already filed or obtained by the same company.

2. Description of the Prior Art

In particular, its release or tripping mechanism is closely related to the mechanism already described in U.S. patent application No. 675,039 filed on the Nov. 29, 1983 for: "Device for carrying and releasing loads on an aircraft with triple roller escapement" and to the device described in U.S. Pat. No. 4,202,576, in which the loads are secured by a complementary raising of the hooks, these latter being spaced apart by 14 inches and/or 30 inches.

SUMMARY OF THE INVENTION

Since the complementary raising movement of the hooks may be insufficient for securing loads with substantially different diameters from 200 mm for example to infinity (flat loads) to the same fixed supports, the present invention provides special hinged supports which may take up several positions depending on the diameter of the load, these positions being made automatically irreversible by interpositioning of spring loaded stepped abutment cams. The operation for positioning these supports is extremely simple: after hooking on the load (hooks in the low position), it is sufficient to lower the hinged supports by bringing them into contact with the load so that the corresponding cams, pushed by the springs, then interpose the suitable abutment step limiting the rising movement of the support.

So as to be able to carry out this operation from one side or the other of the device and thus reduce the time for positioning the load, each support is connected with the opposite one by gears and a flexible coupling so that these supports can be lowered or raised simultaneously. The flexible coupling is intended to offset the manufacturing tolerances of the parts, so that the butt of each support arm comes into contact with the step of the cams which is associated therewith, without the connecting means being subjected to high stresses should simultaneity of the contacts not be achieved.

The correct position of the stop cams which must correspond to the load carried is checked by means of a handle moving in front of a graduation indicating the diameter of the loads. So as to detect the possible nose to nose engagement between the stop of the bearing arms and the steps of the cams, marks are provided on the arms for simultaneously checking that their position corresponds to that of the stop forming cams, that is to say to the same diameter of load carried.

BRIEF DESCRIPTION OF THE DRAWINGS

For a better understanding of the invention, one embodiment thereof will be described hereafter in greater detail with reference to the accompanying schematical drawings in which:

FIG. 4 shows a top view of the connection of two cams with opposite steps;

FIG. 5 shows the display for checking the correct position of the supports and of the stepped cams; and FIGS. 6, 7 and 8 show the different possible positions of the supports as a function of the diameter of the loads carried.

DESCRIPTION OF THE PREFERRED EMBODIMENT

Figure 1:
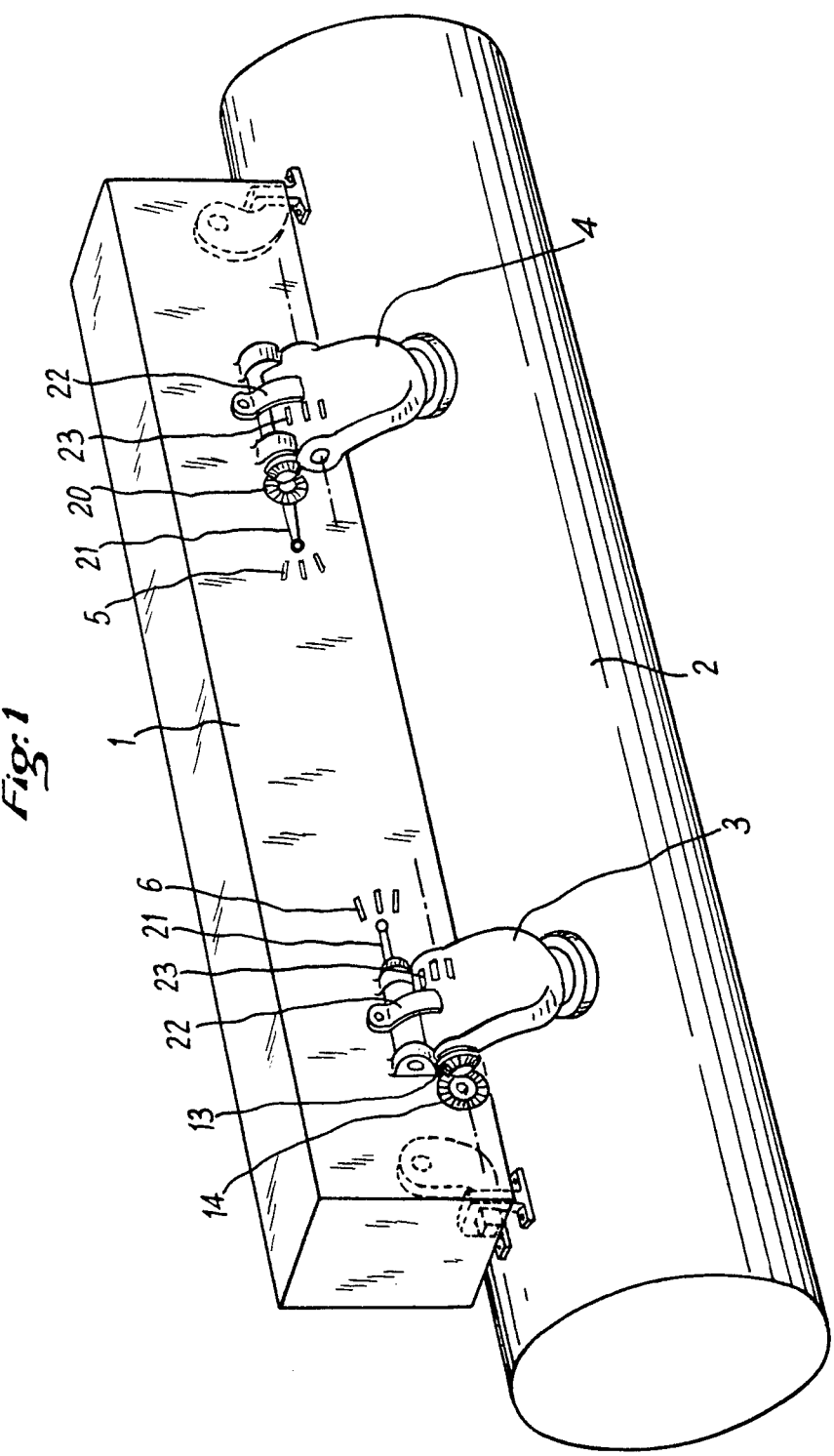
FIG. 1 is an external view of the ejecting release assembly, shown in schematical perspective.

The schematical view of FIG. 1 shows an ejecting release device 1 in the form of a rectangular parallelepiped and the load 2 in the form of a cylinder having two rings suspended from two hooks of the release means, this load being secured by hinged supports 3–4 bearing on one side of the release means which also carries two symmetrical supports on the opposite side. At 5 and 6 are shown the references indicating the positions of the stepped cams.

Figure 2:
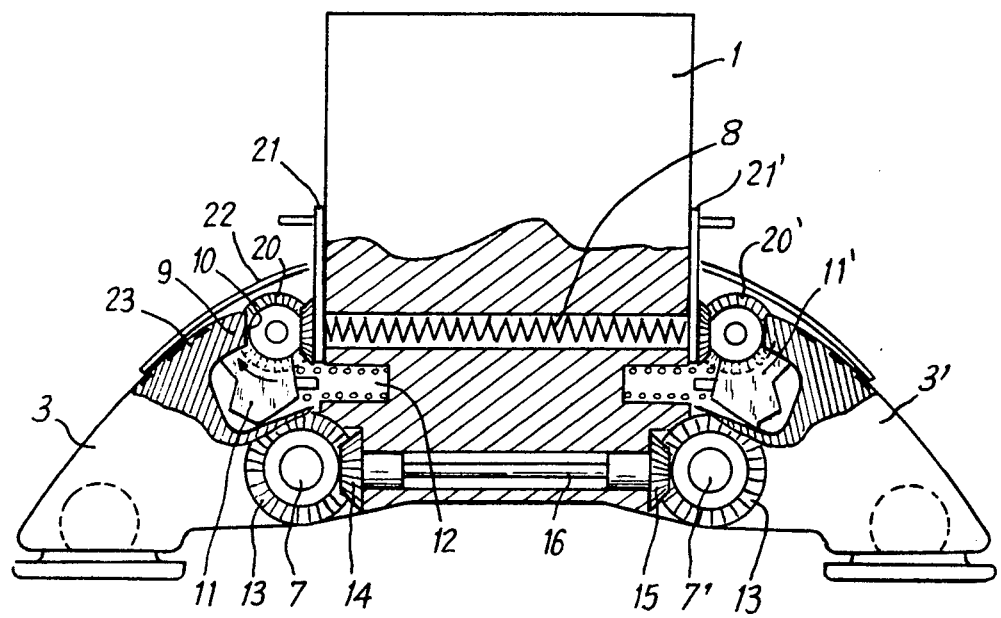
FIG. 2 is a partial cross sectional view showing the hinged supports.
Figure 3:
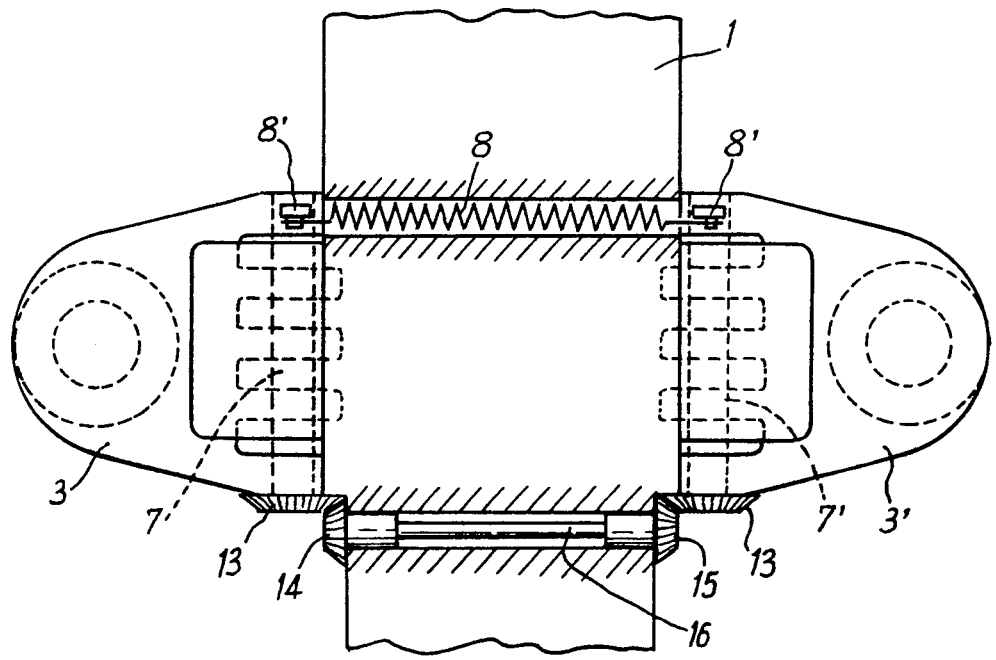
FIG. 3 is a partial plan view showing the same supports.

FIG. 2 shows two opposite support arms terminated by pivoting securing elements. These arms may pivot about axes 7—7' and they are urged into a top position by a common traction spring 8 passing through the release means and hooked by its ends to the studs 8' (FIG. 3) fixed respectively to arms 3—3'.

Each support arm 3—3' has towards the top a retaining butt 9 which, in the raised position of the arms of FIG. 2, is in abutment against step 10 of the stepped cam 11—11', this step 10 being the one which is the closest to the pivoting axis of the cam 11—11' subjected to the action of a spring 12 causing it to pivot in the direction of the arrow in FIG. 2 when arm 3 is lowered so that this cam may present, opposite the retaining butt 9 of the arm, its following steps at increasing distances from its axis so as to maintain the arm 3—3' in lower positions than in FIG. 2.

Each arm 3—3' has a bevel gear 13 whose axis coincides with the pivoting axis of the arm and the gears 13 of two opposite arms 3—3' are connected together by two bevel gears 14–15 meshing with the gears 13 and supported by the ends of a flexible connection 16 such as a blade.

As shown in FIGS. 2 and 4, each cam 11—11' is firmly secured to a bevel gear 20—20' and the two gears 20—20' of opposite cams mesh respectively with two bevel gears firmly secured respectively to two operating and control levers 21—21' supported respectively by the two ends of a transverse rotary shaft 24 passing through the release means 1. The handle of each of the operating levers 21—21' moves opposite a graduation 5 (FIG. 5) which was mentioned above for checking the position of the stepped cams 11—11' whereas the position of each arm 3—3' may be read opposite a fixed index 22 on a graduation 23 carried by the arm (FIGS. 1 and 5).

The operation of the device shown may be summed up as indicated hereafter. Before hooking on the load to be carried, the hooks of the ejector are brought to their low position by the means described in French Pat. No.

77.39818 belonging to the same firm and bearing arms 3—3' are raised so as to facilitate the operation as much as possible; since the support arms 3—3' are urged upwardly by springs 8, it is sufficient to check that the stepped cams 11—11' are in the position shown in FIG. 2 allowing the support arms 3—3' to assume the highest position corresponding to carrying the largest load, i.e. the position shown in FIG. 6. Then the load is hooked on the two hooks of the ejector and support arms 3—3' are lowered to bring them manually into contact with the load, each support arm 3—3' driving the transversely opposed arm by the rotating transmission 16 which connects the two opposite arms together. Cams 11—11', urged by springs 12, automatically intervene so as to limit the raising of the supports by presenting, opposite the retaining butts 9, steps further away from the axes of the cams than steps 10. The correct position of the cams causes the correct positioning of levers 21 opposite the graduations 5-6, which allows the positioning of the cams to be checked. The support arms 3—3' are checked to see that they have assumed the yoked position by checking that the pointers 22 are opposite the corresponding marks.

FIGS. 6, 7 and 8 show respectively the positions which a support arm 3 and the associated stepped cam 11 may assume for carrying loads of a diameter in the following ranges:

1. Diameter greater than or equal to 700 mm;
2. Diameter between 700 and 350 mm;
3. Diameter between 350 and 200 mm;

In each of these Figures, the two end profiles have been shown of the loads to which the particular position of arm 3 corresponds. These end profiles comprise for FIG. 6, the rectilinear profile 25 of a flat load and profile 26 of a load having a diameter of 700 mm; they comprise, for FIG. 7, the above profile 26 and the profile 27 of a load having a diameter of 350 mm and finally, for FIG. 8, they comprise the above profile 27 and the profile 28 of a load having a diameter of 200 mm. In the three FIGS. 6, 7 and 8, the extreme sizes A and B of the top of the load have been shown with respect to the base of the ejector, these sizes being the same for the three series of load diameters corresponding to the stop engagement of the support arms against the three steps of cams 11. These sizes are always compatible with the raising stroke allowed for the hooks.

It will be noted that the arrangements forming the subject of the present invention could be used in association with an independent carrying device which may be raised as a whole, the support arms then being stored on a fixed element of the aircraft.

What we claim is:

1. A device for carrying under an aircraft and ejecting loads having suspension rings suspended from hooks, which comprises:
    (a) pivotable hooks coacting with suspension rings of the load, said hooks being movable between a lowered position and a raised position,
    (b) at least one pair of pivoting support arms hinged on both sides of a support about longitudinal axes, said pivoting support arms being adapted to take a lowered position in which they engage the upper surface of the load to ensure the securing thereof,
    (c) spring means associated with said pivoting support arms for urging said arms in a raised position,
    (d) rotating cam-shaped members each associated with a pivoting support arm of said pair, each cam-shaped member comprising stepped parts at increasing distances from its axis, and
    (e) a retention butt provided in each pivoting support arm, and retention butt selectively bearing on one of the stepped parts of the cam-shaped member, according to the diameter range of the load, to limit the raising of said arms when the hooks to which the load is suspended are moved in their raised positions.

2. The device as claimed in claim 1 wherein said cam-shaped member intervenes under the action of a spring for limiting the upward return movement of said support arm after this support arm has been lowered into contact with the load.

3. The device as claimed in claim 1 wherein each said support arm is coupled to the transversely opposite support arm of said pair by gears and a flexible connection so as to ensure simultaneous movement of the support arms and simultaneous engagement thereof with the associated cam-shaped members.

4. The device as claimed in claim 1 wherein levers are provided which are integral with the cam-shaped members and indicate the position thereof in front of marks corresponding to the diameters of the loads to be carried.

5. The device as claimed in claim 1 wherein marks are provided on the support arms for checking the correct position thereof with respect to the cam-shaped members limiting the rising movement of the support arms.

* * * * *